US010909427B2

(12) United States Patent
Chen

(10) Patent No.: US 10,909,427 B2
(45) Date of Patent: Feb. 2, 2021

(54) METHOD AND DEVICE FOR CLASSIFYING WEBPAGES

(71) Applicants: BEIJING QIHOO TECHNOLOGY COMPANY LIMITED, Beijing (CN); QIZHI SOFTWARE (BEIJING) COMPANY LIMITED, Beijing (CN)

(72) Inventor: Jinping Chen, Beijing (CN)

(73) Assignees: BEIJING QIHOO TECHOLOGY COMPANY LIMITED, Beijing (CN); QIZHI SOFTWARE (BEIJING) COMPANY LIMITED, Beijing (CN)

( * ) Notice: Subject to any disclaimer, the term of this patent is extended or adjusted under 35 U.S.C. 154(b) by 390 days.

(21) Appl. No.: 15/740,092

(22) PCT Filed: Mar. 31, 2016

(86) PCT No.: PCT/CN2016/078051
§ 371 (c)(1),
(2) Date: Dec. 27, 2017

(87) PCT Pub. No.: WO2017/000610
PCT Pub. Date: Jan. 5, 2017

(65) Prior Publication Data
US 2018/0189614 A1 Jul. 5, 2018

(30) Foreign Application Priority Data
Jun. 30, 2015 (CN) .......................... 2015 1 0378183

(51) Int. Cl.
*G06K 9/62* (2006.01)
*G06F 16/955* (2019.01)
(Continued)

(52) U.S. Cl.
CPC ......... *G06K 9/6278* (2013.01); *G06F 16/951* (2019.01); *G06F 16/955* (2019.01);
(Continued)

(58) Field of Classification Search
CPC ............ G06K 9/6278; G06K 9/00442; G06K 9/6276; G06F 40/205; G06F 40/14;
(Continued)

(56) References Cited

U.S. PATENT DOCUMENTS

| 20,090,034 | 2/2009 | Fan et al. | |
| 2005/0033657 A1* | 2/2005 | Herrington | ........ G06Q 30/0631 705/26.7 |

(Continued)

FOREIGN PATENT DOCUMENTS

| CN | 101281521 | 10/2008 |
| CN | 101551806 | 10/2009 |

(Continued)

OTHER PUBLICATIONS

English Translation of International Search Report of PCT/CN2016/078051 dated Jun. 23, 2016.
Written Opinion of the International Search Authority of PCT/CN2016/078051.
1st Office Action and initial search of Chinese Application No. 201510378183.5.

(Continued)

*Primary Examiner* — Quoc A Tran
(74) *Attorney, Agent, or Firm* — Westbridge IP LLC

(57) ABSTRACT

A method and device for classifying webpages are provided. The method comprises: parsing a plurality of webpage elements from a webpage to be predicted; predicting a candidate webpage classification to which the webpage to be predicted belongs respectively according to respective webpage elements; and determining a final webpage classification of the webpage to be predicted by comparing the candidate webpage classifications predicted respectively based on the respective webpage elements.

3 Claims, 4 Drawing Sheets

(51) Int. Cl.
*G06F 16/958* (2019.01)
*G06F 16/951* (2019.01)
*G06K 9/00* (2006.01)
*G06F 40/14* (2020.01)
*G06F 40/205* (2020.01)
*G06F 3/038* (2013.01)
*G06F 3/0481* (2013.01)
*G06F 3/0482* (2013.01)
*G06F 17/00* (2019.01)

(52) U.S. Cl.
CPC ............ *G06F 16/958* (2019.01); *G06F 40/14* (2020.01); *G06F 40/205* (2020.01); *G06K 9/00442* (2013.01); *G06K 9/6276* (2013.01); *G06F 3/038* (2013.01); *G06F 3/0481* (2013.01); *G06F 3/0482* (2013.01)

(58) Field of Classification Search
CPC .... G06F 16/951; G06F 16/958; G06F 16/955; G06F 3/038; G06F 3/0482
See application file for complete search history.

(56) References Cited

U.S. PATENT DOCUMENTS

2009/0327270 A1* 12/2009 Teevan .................. G06F 16/337
2016/0055132 A1* 2/2016 Garrison ............... G06F 16/958
706/12
2016/0232241 A1* 8/2016 Stoyanov ............ G06F 16/9535

FOREIGN PATENT DOCUMENTS

| CN | 102831128 | 12/2012 |
| CN | 104391860 | 3/2015 |
| CN | 104965905 | 10/2015 |

OTHER PUBLICATIONS

2nd Office Action and initial search of Chinese Application No. 201510378183.5.
3rd Office Action and initial search of Chinese Application No. 201510378183.5.

* cited by examiner

METHOD AND DEVICE FOR CLASSIFYING WEBPAGES

CROSS REFERENCE TO RELATED APPLICATIONS

This application is a national stage application of International Application No. PCT/CN2016/078051 filed on Mar. 31, 2016 which based upon and claims priority to Chinese Patent Application No. 201510378183.5, filed in China on Jun. 30, 2015, the entire contents of which are incorporated herein by reference.

TECHNICAL FIELD

The disclosure relates to the technical field of Internet, and in particular to a method and device for classifying webpages.

BACKGROUND

Webpage classification plays a crucial role in many products on the Internet. For example, in the news media, the classification of news webpages plays a very important role in organizing news content reasonably and effectively and improving user's reading experience.

The current webpage classification technology is mainly a semi-automatic way to classify the webpages, and accomplish classification with the algorithm and the manual review together. In the algorithm stage, a traditional classification algorithm (such as naive Bayes) is used to classify the webpages preliminarily, but the main problem at this stage is generally that the accuracy cannot be ensured. In the manual review stage, generally the manual review is needed in order to improve the classification accuracy.

The above-mentioned scheme is semi-automatic, so it cannot meet the requirements in a case that a large amount of data needs to be classified. Moreover, since the classification of webpages is generally manually defined in the previous period, the scalability is poor, and the timeliness of the entire system is poor. Since two stages are undergone and the second stage of manual review has high cost of time, the timeliness of the entire system cannot be guaranteed.

SUMMARY

In view of aforesaid problems, the disclosure is put forward to provide a method for classifying webpages and a device for classifying webpages, so as to overcome the aforesaid problems or at least partially solve the aforesaid problems.

According to one aspect of the disclosure, a method for classifying webpages is provided, which includes:

parsing multiple webpage elements from a webpage to be predicted;

predicting a candidate webpage classification to which the webpage to be predicted belongs respectively according to respective webpage elements; and determining a final webpage classification of the webpage to be predicted by comparing the candidate webpage classifications predicted respectively based on the respective webpage elements.

According to another aspect of the disclosure, a device for classifying webpages is provided, which includes one or more processors and a memory; wherein one or more programs are stored in the memory, and when executed by the one or more processors, the one or more programs cause the one or more processors to:

parse a plurality of webpage elements from a webpage to be predicted;

predict a candidate webpage classification to which the webpage to be predicted belongs respectively according to respective webpage elements; and determine a final webpage classification of the webpage to be predicted by comparing the candidate webpage classifications predicted respectively based on the respective webpage elements.

According to still another aspect of the disclosure, there is provided a non-transitory computer readable medium having computer programs stored thereon that, when executed by one or more processors of a computing device, cause the computing device to perform the method for classifying webpages.

According to embodiments of the disclosure, multiple webpage elements of the webpage to be predicted are extracted, the webpage classification of the webpage is predicted multi-dimensionally based on the multiple webpage elements, and a final webpage classification of the webpage to be predicted is determined by comparing the webpage classifications predicted based on the webpage elements. Thus, a fully automatic classification process is realized without the manual involvement, and the efficiency of webpage classification is greatly improved.

Especially for massive webpages of the whole network and webpages newly generated on the Internet, the rapid and effective classification can be realized, and the timeliness of webpage classification can be ensured.

Further, the webpage classification of the disclosure can be generated by mining the historical search logs, which makes full use of the historical search data on one hand, and overcomes the problem of poor scalability of the human-defined webpage classification on the other hand.

Above description is only a summary of the technical scheme of the disclosure. In order to know the technical means of the disclosure more clearly so that it can be put into effect according to the content of the description, and to make aforesaid and other purpose, features and advantages of the disclosure clearer, embodiments of the disclosure are listed below.

BRIEF DESCRIPTION OF THE DRAWINGS

By reading the detailed description of the preferably selected embodiments below, various other advantages and benefits become clear for a person of ordinary skill in the art. The drawings are only used for showing the purpose of the preferred embodiments and are not intended to limit the disclosure. And in the whole drawings, same drawing reference signs are used for representing same components. In the drawings.

DETAILED DESCRIPTION

The disclosure is described in further detail with reference to the drawings and embodiments below. Although the drawings show exemplary embodiments of the disclosure, it should be understood that the disclosure may be implemented in various forms but should not be limit to the embodiments set forth herein. On the contrary, these embodiments contribute to a more thorough understanding of the disclosure, and can completely convey the scope of the disclosure to those skilled in the art.

Figure 1:
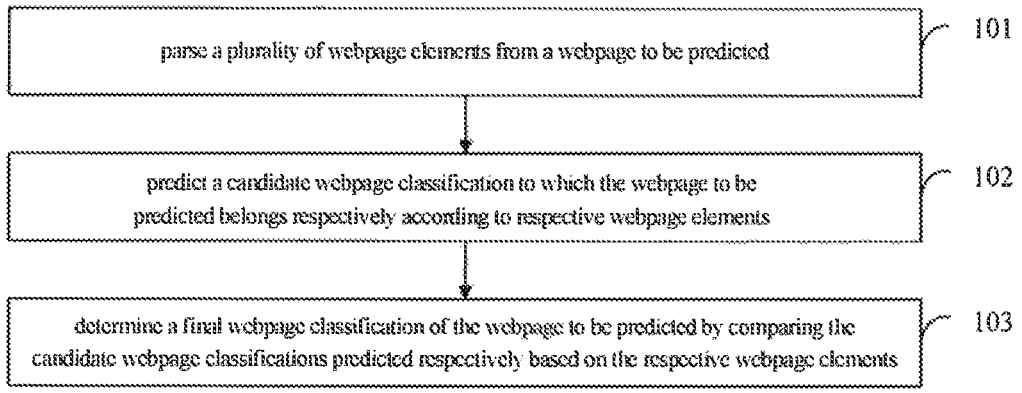
FIG. 1 shows a flowchart of a method for classifying webpages according to a first embodiment of the disclosure.

Referring to FIG. 1, FIG. 1 shows a flowchart of a method for classifying webpages according to a first embodiment of the disclosure.

In step 101, multiple webpage elements are parsed from a webpage to be predicted.

In an embodiment of the disclosure, the webpage classification is predicted according to the webpage elements. The webpage element may be a part of the webpage to be predicted, and for example, may include any of a root domain name of the webpage, a webpage title, a webpage text and a webpage URL. The webpage element may also be an attribute of the webpage to be predicted, for example, a network transport protocol supported by the webpage, webpage size, webpage connection encryption manner and webpage creation time. In the specific implementation, any suitable type of webpage elements may be used, which is not limited in the disclosure.

In step 102, a candidate webpage classification to which the webpage to be predicted belongs is predicted separately according to respective webpage elements.

Multiple webpage elements are parsed from the webpage to be predicted, and with respect to each of the webpage elements, the webpage classification to which the webpage to be predicted belongs is predicted respectively as the candidate webpage classification according to each of the webpage elements.

For the predicting the webpage classification according to the respective webpage elements, the mapping relationship between the webpage elements and the webpage classifications can be established in advance by analyzing a large number of sample webpages, and further, the webpage classification corresponding to the webpage can be found according to the webpage elements. Optionally, a predicting model for predicting the webpage classification based on the webpage elements can be created in advance by analyzing a large number of sample webpages, and further the webpage elements are inputted into the corresponding predicting model, and the result outputted by the predicting model is taken as the webpage classification corresponding to the webpage. Any suitable way may also be used for predicting the webpage classification according to the webpage elements, which is not limited in the disclosure.

In step 103, a final webpage classification of the webpage to be predicted is determined by comparing the candidate webpage classifications predicted based on the respective webpage elements.

A final webpage classification that more accurately describes the webpage to be predicted is selected from the candidate webpage classifications by comparing the candidate webpage classifications predicted based on the respective webpage elements. Specifically, the final webpage classification may be selected according to the text similarity between each of the candidate webpage classifications and the webpage to be predicted, and the candidate webpage classification for which the text similarity compared with the webpage to be predicted is ranked high or exceeds a threshold may be taken as the final webpage classification. Optionally, the characterization weights of the preset webpage elements to the webpage to be predicted are compared, and the candidate webpage classification regarding which the characterization weight for the webpage to be predicted is ranked high may be taken as the final webpage classification. Moreover, the number of taking the candidate webpage classification as the final webpage classification may be counted, and the candidate webpage classification for which the number is ranked high may be taken as the final webpage classification. Any suitable way may also be used for determining the final webpage classification from the candidate webpage classifications, and the number of the final webpage classification may be one or multiple, which is not limited in the disclosure.

According to the embodiments of the disclosure, multiple webpage elements of the webpage to be predicted are extracted, the webpage classification of the webpage is predicted multi-dimensionally based on the multiple webpage elements, and a final webpage classification of the webpage to be predicted is determined by comparing the webpage classifications predicted based on the multiple webpage elements. Thus, a fully automatic classification process is realized without the manual involvement, and the efficiency of webpage classification is greatly improved. Especially for massive webpages of the whole network and webpages newly generated on the Internet, the rapid and effective classification can be realized, and the timeliness of webpage classification can be ensured.

Figure 2:
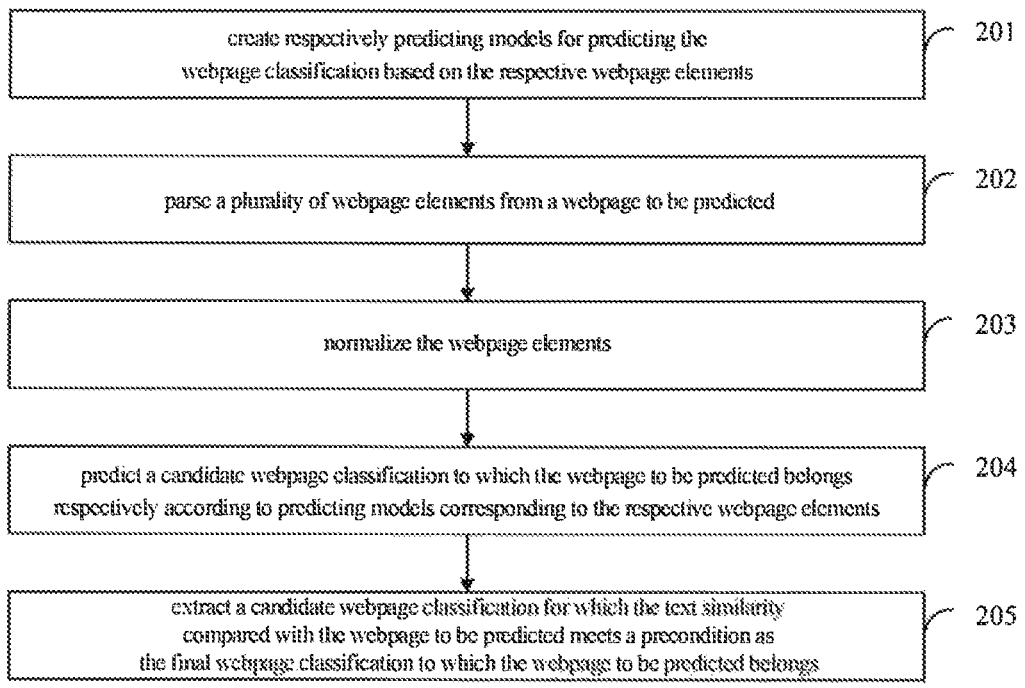
FIG. 2 shows a flowchart of a method for classifying webpages according to a second embodiment of the disclosure.

Referring to FIG. 2, FIG. 2 shows a flowchart of a method for classifying webpages according to a second embodiment of the disclosure.

In step S201, a predicting model for predicting the webpage classification based on the respective webpage elements is created separately with respect to the respective webpage elements.

Compared with the previous embodiment, a predicting model is used to predict the webpage classification in this embodiment. Therefore, before parsing the webpage elements of the webpage to be predicted, a predicting model for predicting the webpage classification based on the respective webpage elements is created for the respective webpage elements. A large number of webpages and the corresponding webpage classifications are collected in advance, the webpage elements of the webpage are parsed, and then a predicting model for predicting the webpage classification based on the webpage elements is created. The predicting model may be of any applicable type, for example, a Bayes model, a KNN (k-Nearest Neighbor, K nearest neighbor) model and the like.

In step S202, multiple webpage elements are parsed from a webpage to be predicted.

In step S203, the webpage elements are normalized.

Compared with the previous embodiment, in this embodiment, after the webpage elements are extracted, the webpage elements are normalized further, for example, removing special characters, performing case conversion, format conversion, or the like, and the processed webpage elements facilitate the further analysis and processing.

In step S204, candidate webpage classifications to which the webpage to be predicted belongs are predicted separately according to the predicting models corresponding to the respective webpage elements.

In step S205, candidate webpage classification for which the text similarity compared with the webpage to be predicted meets a precondition are extracted as the final webpage classifications to which the webpage to be predicted belongs.

In this embodiment, the final webpage classification is selected from the candidate webpage classifications based on the text similarity, the text similarity between the respective candidate webpage classifications and the webpage to be predicted is calculated, and the final webpage classification is selected based on whether the text similarity meeting the selecting condition. For example, a candidate webpage classification ranked high after ordering based on size of the text similarity is selected or a candidate webpage classification for which the text similarity is within a preset range is selected or a candidate webpage classification for which the text similarity meets multiple different preset ranges is selected. The specific selection method may be set according to the actual application and needs.

According to the embodiments of the disclosure, multiple webpage elements of the webpage to be predicted are extracted, the webpage classification of the webpage is predicted multi-dimensionally based on the multiple webpage elements, and a final webpage classification of the webpage to be predicted is determined by comparing the webpage classifications predicted correspondingly based on the multiple webpage elements. Thus, a fully automatic classification process is realized without the manual involvement, and the efficiency of webpage classification is greatly improved. Especially for massive webpages of the whole network and webpages newly generated on the Internet, the rapid and effective classification can be realized, and the timeliness of webpage classification can be ensured.

In an embodiment of the disclosure, preferably, the step 201 may include:

sub-step S1, mining a plurality of webpage classifications and queries which belong to the webpage classifications based on search logs; and sub-step S2, with respect to the respective webpage elements, creating a predicting model for predicting the webpage classification based on the webpage elements according to the webpage elements and the related queries in the search logs.

The webpage classification of the disclosure can be generated by mining the historical search logs, which makes full use of the historical search data on one hand, and overcomes the problem of poor scalability of the human-defined webpage classification on the other hand.

The historical search behaviors between the terminal and the server are recorded in the search log, which may include various search behaviors, such as inputting search keywords, feeding back search results based on the query keywords, clicking on search results, turning pages or re-entering search results. The historical search behaviors may be recorded by the terminal, or may be recorded by the server.

Specifically, the queries inputted by the user may be obtained by parsing the search log, the queries may be recorded statistically, the queries satisfying the requirement may be extracted as a webpage classification according to the preset rules, and other queries associated with the queries satisfying the requirement may be regarded as queries belonging to the webpage classification. For the queries that can be taken as the webpage classification, since the target webpages that are displayed or accessed according to the queries is recorded in the search log, the corresponding queries may be taken as the webpage classification of the target webpage, the target webpage is further parsed, and then a predicting model for predicting the webpage classification based on the webpage elements is created according to the obtained correspondence between the webpage elements and the webpage classifications.

Further, preferably, the sub-step S1 may include:

sub-step S11, counting search frequencies of the respective queries in the search logs;

sub-step S12, extracting a query of which the search frequency is greater than a preset threshold as a webpage classification or extracting a predetermined proportion of the queries as webpage classifications; and sub-step S13, extracting a query which triggers the same webpage as that triggered by the webpage classification and adding the query into the webpage classification.

In the embodiment of the disclosure, a hot query with a high search frequency is taken as a webpage classification. The corresponding query is extracted from the search log, the corresponding search frequency is counted according to the number of searching each query, and a query of which the search frequency is greater than a preset threshold or a preset ratio is extracted as a webpage classification. Multiple similar queries can be merged before the webpage classification is determined, for example, Peking University and PKU can be merged into one query.

Further, a query that triggers the webpage to be searched is set for the respective webpage classifications. In this embodiment of the disclosure, since in the search log a webpage is triggered as a query result by the query being taken as the webpage classification, a query which triggers the same webpage as that triggered by the webpage classification is added into the webpage classification and is taken as the query which triggers a webpage belonging to the webpage classification as the search result.

In an embodiment of the disclosure, preferably, the webpage elements may include: a root domain name or a webpage title of the webpage. Correspondingly, the step of parsing multiple webpage elements from a webpage to be predicted include parsing the webpage to be predicted to extract the root domain name and/or the webpage title of the webpage to be predicted.

In an embodiment of the disclosure, preferably, in a case that the webpage elements include a root domain name, the predicting model includes a first predicting model for predicting the webpage classification based on the root domain name, and the sub-step S2 may include:

sub-step S21, extracting a root domain name of a historical webpage accessed correspondingly in the search logs;

sub-step S22, recording statistically a query corresponding to each root domain name according to a plurality of historical webpages and queries for triggering the historical webpages in the search logs; and sub-step S23, calculating a first probability of the root domain name belonging to each webpage classification according to the webpage classification to which the query belongs, and creating the first predicting model comprising a judgment condition that the root domain name belongs to each webpage classifications based on the first probability.

For the accessed historical webpages in the search log, a root domain name (host) of the webpage is extracted from the historical webpage URL. Different historical webpages may correspond to the same root domain name. Therefore, one root domain name corresponds to one or more historical webpages. Further, for each of the historical webpages, the queries recorded in the search log that trigger the historical webpage to be as a query result are counted to obtain one or more queries corresponding to each root domain name. For example, the queries that correspondingly trigger the root domain name sports.sina.com.cn include "Chinese Super League", "Sunke", "NBA", and the alike.

Each query has a corresponding webpage classification to which the query belongs. For the webpage classification of the query corresponding to the root domain name, the probability of the root domain name belonging to each of the webpage classifications is counted and recorded as a first probability. For example, the webpage classification corresponding to the queries "Chinese Super League" and "Sunke" is "football", the webpage classification corresponding to the query "NBA" is "basketball", the webpage classification of the two queries corresponding to the root domain name sports.sina.com.cn are "football", the webpage classification of the one query is "basketball". The probability of the root domain name belonging to the webpage classification "football" may be 2/3, and the probability of the root domain name belonging to the webpage classification "basketball" may be 1/3. Here, the method for calculating the probability is just as an example, and any other applicable method may be used in the specific implementation.

Further, the predicting model for predicting a webpage classification based on a root domain name may be created based on the first probability of the each root domain name corresponding to the webpage classification. Correspondingly, the step 204 may include:

sub-step S3, extracting the root domain name of the target webpage and inputting the root domain name into the first predicting model; and sub-step S4, determining by the first predicting model that the first probability of which the root domain name belongs to a webpage classification is greater than a first target probability, and taking the webpage classification as the candidate webpage classification to which the target webpage belongs.

The root domain name of the target webpage is inputted into the first predicting model, the first probability of the root domain name belonging to each webpage classification is searched by the first predicting model. If it is determined that the first probability is greater than a preset first target probability, the webpage classification corresponding to the first probability is outputted as a result, namely the predicted candidate webpage classification, and the number of the outputted candidate webpage classifications may be one or more.

In an embodiment of the disclosure, preferably, in a case that the webpage elements include a webpage title, the predicting model includes a second predicting model for predicting the webpage classification based on the webpage title, the sub-step S2 may include:

sub-step S24, generating a first inverted index for retrieving the webpage classification based on a query according to the webpage classification and the query belonging to the webpage classification, and creating the second predicting model comprising the first inverted index.

Inverted index is derived from the need to search for records based on the value of the attribute in the practical application. Each item in this index table includes an attribute value and an address of each record that has the attribute value. The attribute value is not determined based on the record, but the location of record is determined by the attribute value, so it is called inverted index. The webpage classifications and the queries belonging to each webpage classification are obtained through the foregoing steps. If there is a need to search for the corresponding webpage classification based on the query, the webpage classifications are needed to be searched one by one for the query. If the query is found, the webpage classification is taken as the webpage classification corresponding to the query. The steps are cumbersome and much time is consumed. In the embodiment of the disclosure, the webpage classification is searched correspondingly with respect to each of the queries, and the corresponding relationships between the query and one or more webpage classifications are established. In searching for the corresponding webpage classification based on the query, at least one corresponding webpage classification may be directly extracted according to the query, saving the query time.

A second predicting model for predicting the webpage classification based on the query may be created according to the first inverted index for the query and the webpage classification. The second predicting model trained herein is preferably a KNN model for which the basic principle is that, if the majority of the k most similar (namely the nearest neighbor in the feature space) samples of a sample in the feature space belong to a classification, the sample also belongs to this classification. In the KNN algorithm, all the selected neighbors are already correctly classified, the classification of the sample to be classified is determined according to only the classifications of one or several nearest neighbors in the classifying decision. Although the KNN model theoretically dependents on the limit theorem, only a very small number of the neighboring samples are relevant in the classifying decision. Since the KNN model mainly depends on the surrounding limited neighboring samples to determine the classification, instead of the way of discriminating the class fields, the KNN model is particularly suitable for the to-be-classified samples set for which the class fields have more intersections or have more overlaps. The second predicting model may also be any other applicable model in the specific implementation.

Correspondingly, the step 204 may include:

sub-step S5, extracting a query included in the webpage title of the target webpage and inputting the query into the second predicting model; and sub-step S6, finding by the second predicting model a webpage classification corresponding to the query according to the first inverted index, and taking the found webpage classification as the candidate webpage classification to which the target webpage belongs.

The predicting is performed based on the query in the second predicting model, and the webpage title of the target webpage may be composed of multiple words. Therefore, the webpage title may be segmented according to the query, and at least one query obtained by the segmentation may be inputted into the second predicting model, and then the candidate webpage classification predicted based on the webpage title is searched and inputted in the second predicting model according to the correspondence between the queries and the webpage classifications.

In an embodiment of the disclosure, preferably, in a case that the webpage elements include a webpage title, the predicting model includes a second predicting model for predicting the webpage classification based on the webpage title, and the sub-step S2 may include:

sub-step S25, adding pre-collected queries into the webpage classification according to the query belonging to the webpage classification, generating a second inverted index for retrieving the webpage classification based on the added query, and creating the second predicting model comprising the second inverted index.

Different from the sub-step S24, here, an inverted index is generated based on the pre-collected queries, and the second predicting model created herein may also be a KNN model.

Correspondingly, the step 204 may include:

sub-step S7, extracting a query included in the webpage title of the target webpage and inputting the query into the second predicting model; and sub-step S8, finding by the second predicting model a webpage classification corresponding to the extracted query according to the second inverted index, and taking the found webpage classification as the candidate webpage classification to which the target webpage belongs.

The query is extracted from the webpage title of the target webpage according to the pre-collected queries, the extracted query is inputted into the second predicting model, and the corresponding candidate webpage classification is searched according to the second inverted index in the second predicting model.

In an embodiment of the disclosure, preferably, in a case that the webpage elements include a webpage title, the predicting model includes a third predicting model for predicting the webpage classification based on the segmented term of the webpage title, the sub-step S2 may include:

sub-step S26, segmenting the queries and recording statistically the webpage classification to which each segmented term belongs; and sub-step S27, calculating a second probability of which each query belong to respective webpage classifications, and creating the third predicting model comprising a judgment condition that each segmented term belongs to the respective webpage classification based on the second probability.

One or more webpage classifications to which each segmented term belongs may be counted according to the segmented terms of the query and the webpage classification corresponding to the query. The second probability of which each segmented term belongs to respective webpage classifications may be calculated according to the correspondence between the segmented terms and the webpage classifications. For example, the webpage classifications corresponding to the segmented term "Chinese Super League" includes "sports" and "football", and the probabilities of the segmented term belonging to each of the webpage classifications are 1/2 respectively. Here, the method for calculating the probability is just as an example, and any other suitable method may be used in the specific implementation.

A third predicting model for predicting a webpage classification based on the segmented terms may be created according to the second probability of which each segmented term belongs to respective webpage classifications. The third predicting model created herein may be a naive Bayes model. Compared with other models, the naive Bayes model is created based on a simple assumption that attributes are independent of each other when a target value is given. The continuous feature distribution is discretized, the probabilities of the discrete values are simply calculated under the naive Bayes assumption, and then the complex distribution feature is transformed into a simple naive Bayes model.

Correspondingly, the step 204 may include:

sub-step S9, segmenting the webpage title of the target webpage and inputting segmented terms into the third predicting model; and sub-step S10, with respect to the segmented term, determining by the third predicting model that the second probability of which the segmented term belongs to any of the webpage classifications is greater than a second target probability, and taking the webpage classification as the candidate webpage classification to which the target webpage belongs.

In predicting the webpage classification according to the webpage title, firstly, the webpage title is segmented, the segmented terms are inputted into the third predicting model, and second probabilities of the segmented term belonging to respective webpage classifications is determined by the third predicting model. In a case that it is determined that any of the second probabilities is greater than the preset second target probability, the webpage classification corresponding to the second probability may be outputted as a result, namely the predicted candidate webpage classification, and the number of the outputted candidate webpage classifications may be one or more.

In this embodiment, the final webpage classification is determined according to the text similarity between the candidate webpage classification and the target webpage, preferably, before the step 205, the method further includes:

segmenting respective queries belonging to the webpage classification, and extracting a part of the segmented terms to create a term vector of the webpage classification according to the term frequency of the segmented term and the inverse document frequency.

Term Frequency (TF) and Inverse Document Frequency (IDF) are used to assess how important a term is for a file set or one of documents in a corpus. The importance of the term increases in a direct proportion with the number of occurrences of the term in the document, while the importance of the term decreases in an inverse proportion with the frequency of occurrences of the term in corpus.

The queries are segmented for the webpage classifications. The same segmented term may exist for different queries. For example, the segmented terms corresponding to the query CBA live broadcast are CBA and live broadcast, the segmented terms corresponding to the query CBA iQIYI are CBA and iQIYI, and the common segmented term is CBA. In this embodiment, the term frequency of the segmented term refers to a frequency of a given term occurring in the document, which may be obtained by counting the number of occurrences of the given term in the webpage classification to which the term belongs. The greater the number of occurrences of the term, the higher the corresponding term frequency. The reverse document frequency of the segmented term may be obtained by dividing the total number of the documents by the number of documents containing the term and then taking the logarithm of the obtained quotient. If a segmented term only occurs in one webpage classification, the reverse document frequency of the term is higher. If a segmented term occurs in more than one webpage classification, its reverse document frequency is lower.

A part of the segmented terms are selected according to the term frequency and the inverse document frequency to create a term vector. For example, a numeric range may be set, the segmented terms for which the product of the term frequency and the inverse document frequency meets the numeric range are selected, or any other available selection mode may be used to select the segmented terms according to the term frequency and the inverse document frequency.

With respect to each of the webpage classifications, the term vector of the webpage classification can be created according to the segmented terms of the query, the term frequency of respective segmented term and the inverse document frequency.

Correspondingly, the step 205 may include:

sub-step S11, segmenting webpage titles and texts of the target webpage and creating a term vector of the target webpage; and sub-step S12, calculating a cosine similarity between the term vector of the candidate webpage classification and the term vector of the target webpage, and extracting a candidate webpage classification for which the cosine similarity meets a preset range as the final webpage classification to which the target webpage belongs.

In the embodiment of the disclosure, the candidate webpage classification having a high text similarity with the target webpage is taken as the webpage classification for more accurately describing the target webpage. The text similarity between the candidate webpage classification and the target webpage is represented by the similarity between the term vectors of respective candidate webpage classifications and the term vector of the target webpage.

After the term vectors of the respective candidate webpage classification and the term vector of the target webpage are created, the similarity between the term vectors is calculated. A cosine similarity is a mensuration for comparing similarities of documents. In specific implementation, other applicable calculation methods may also be used. For example, the relative entropy and the average mutual communication between the candidate webpage classification and the target webpage are calculated to calculate the similarity between the both.

It should be noted that, for the foregoing method embodiments, all of them are described as a series of action combinations for simplicity of the description, but those skilled in the art should know that the present disclosure is not limited to the sequence of actions described, because some steps may be performed in other sequences or simultaneously according to the disclosure. Secondly, those skilled in the art should also know that all the embodiments described in the specification are the preferred embodiments, and the involved actions are not necessarily essential to the disclosure.

In order to make those skilled in the art better understand the disclosure, a method for classifying webpages according to an embodiment of the disclosure is illustrated by way of a specific example below.

Figure 3:
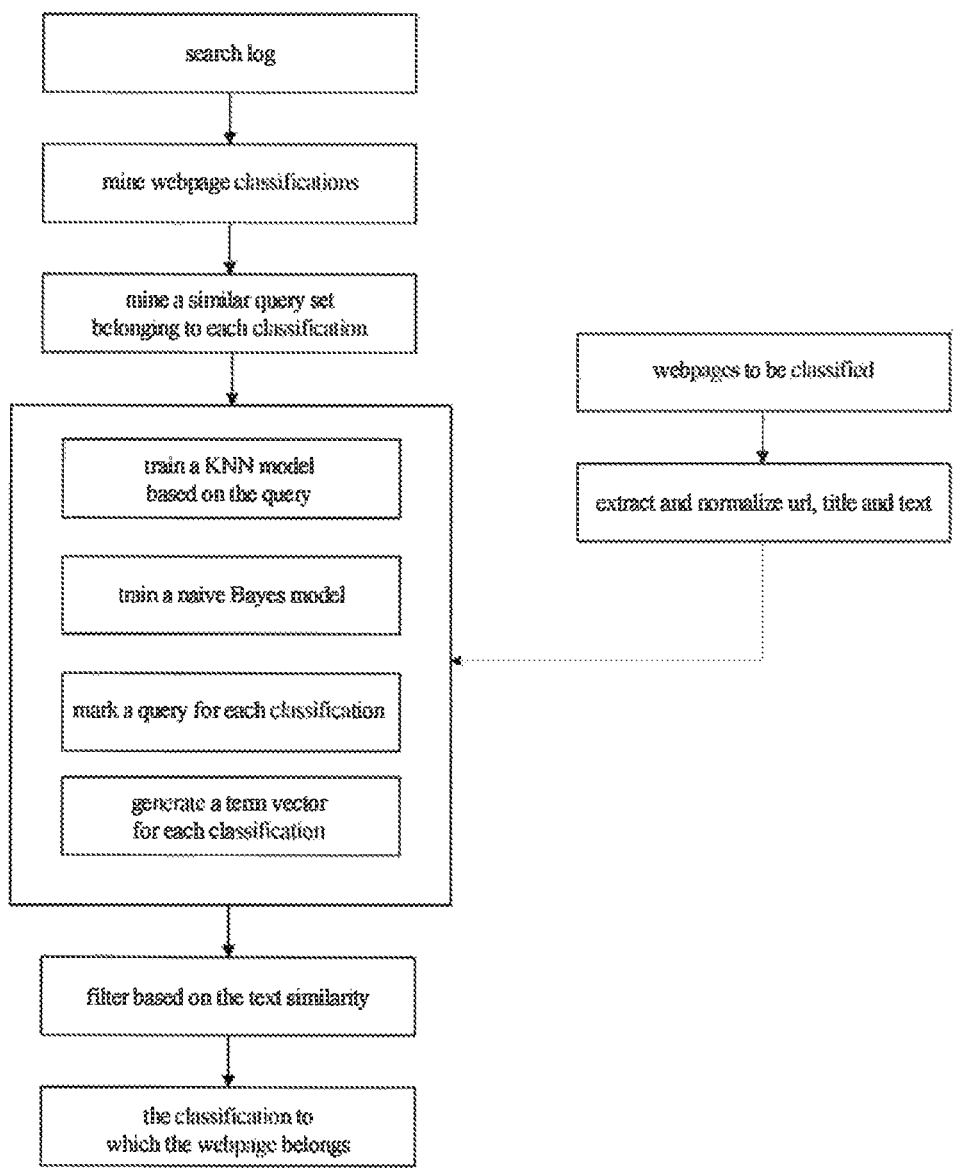
FIG. 3 shows a flowchart of a method for classifying webpages in an example according to an embodiment of the disclosure.

As shown in FIG. 3, FIG. 3 shows a flowchart of a method for classifying webpages in an example according to an embodiment of the disclosure.

First, webpage classifications are mined. Several similar queries are merged based on the searched hot queries (query), and the hot queries are taken as the webpage classifications into which webpages need to be assigned. A group of similar queries are gathered for each of the webpage classifications by using the search click log and are used as the basic data for subsequent model training.

Second, a predicting model based on the root domain name (host) is trained. A classification to which each host may belong and the corresponding probability are counted based on the search click log and the basic data mined in the first step.

Third, a KNN predicting model is trained. The similar queries gathered under each classification are treated as one document in the basic data obtained in the first step, and a first inverted index from the queries to the classifications is generated to find the query contained in the webpage via the title of the webpage and then find the classification to which the query belongs.

Fourth, a naive Bayes model is trained. The queries gathered under each classification are segmented in the basic data obtained in the first step, and all probabilities required for the model are counted at the term level.

Fifth, a common query is marked for each classification. With reference to the query data under each classification, a batch of pre-collected queries are marked for each classification as the important corpus data for the webpage classification, and the first inverted index from the query to the classification is created.

Sixth, a term vector is generated for each classification. The queries gathered under each classification are segmented in the basic data obtained in the first step, and a term vector is generated for each classification by recording the TF-IDF of each term under the classification.

Seventh, webpages are classified.

Firstly, the inputted webpage content is normalized, such as removing special characters, performing case conversion, etc.

Secondly, the host of the webpage is extracted from the URL of the webpage, and the webpage classification to which the webpage may belong and its probability is predicted by means of the predicting model based on host. If the probability of belonging to a classification is greater than the specified threshold, the webpage is classified into the classification.

Then, the title in the webpage is extracted, and all the queries contained in the title are found by a way of fuzzy matching. The most likely classification of the webpage is predicted by means of the trained KNN model based on the query.

Next, the title is segmented, and the likely classification of the webpage is predicted by means of the trained naive Bayes model.

In addition, the classification of the webpage is predicted by means of the model containing the second inverted index created based on the query manually marked for each classification in advance. That is, if a title contains a keyword, it is considered that the webpage may belong to the classification to which the keyword belongs.

Finally, in order to improve the classification accuracy of the foregoing models, the text similarity between each possible classification and the current webpage needs to be calculated. After the title and the text of the webpage are segmented, the cosine similarity between the segmented term and the term vector of the classification is calculated, and only the webpage classification for which the similarity is greater than a threshold is taken as the final webpage classification.

It should be noted that the order of prediction according to the respective models described above may be randomly set according to the actual needs, which is not limited in the disclosure.

A webpage classification process according to an embodiment of the disclosure is described in detail by taking a webpage http://www.taiwan.cn/ty/list/201411/t20141107_7939115.htm as an example below.

First step, in the classification mining stage, the classification "Chinese Super League" can be mined and a batch of similar queries can be calculated based on the search click data, as follows:

| Classification | Query |
| --- | --- |
| Chinese Super League | Makaba, Super TV, Super League Cup, super shooter, Sunke, Renhang, Sainty |

Second step, a classification model is trained based on the data in the first step.

Third step, key information is extracted and normalized for the webpage to be classified, as follows:

| url | Title | Text |
| --- | --- | --- |
| http://www.taiwan.cn/ty/list/201411/t20141107_7939115.htm | Sainty: Ten million awards uses to encourage to win, Sunke and Renhang will not leave |   Various awards have been announced in this season, but Chinese football is not over yet in this season. At this Sunday, the first matching for the 2014 FA Cup final will be held in Jinan. In order to motivate the team, the 10 million champion bonus is provided by Jiangsu Sainty. The number is greater than 8000000 bonus when Sainty won the second place in 2012 Chinese Super League. [br]   However, Shandong Luneng as Sainty's opponent are not easy to deal with. Luneng has reached the final of the Football Association eight times, and won four times, with the success rate more than half. Shandong team won FA Cup for the first time in 1995, and the place where Shandong team won the trophy was really Nanjing, Jiangsu Province. Of course, Sainty also determines to get this FA Cup. In recent pre-season training of Sainty, Jiangsu team is carrying out targeted exercises. It is known that, in order to encourage team members, Guoxin Group provides an unprecedented 10 million award. [br]   In addition, the future of several players in Sainty team is very concerned by the end of the season. Recently, a portal broke the news that Shanghai East Asia provides 60 million for packing two generals Sun Ke and Ren Hang of Jiangsu Sainty, and the super giants have taken a fancy to several main players in the Sainty team, and even it is talked that 4, 5 main players in Jiangsu have not renewed a contract. It is reported that Shanghai East Asia will increase investment for the next season, and the introduction of strong domestic aid becomes the top priority. Wuxi in the Sainty has now become the focus target of Shanghai Super League. However, since Sunke and Renhang have contracts with the Sainty, and the both will not take the initiative to leave. If not sensational, Sunke and Renhang will still appear in the Sainty team in the next season.[br] |

Fourth step, the above structured data is inputted into the classification module for classification, as follows:

| Step | Algorithm or step | Classification |
| --- | --- | --- |
| 1 | predicting model based on host | None |
| 2 | KNN model based on query | Chinese Super League |
| 3 | based on Bayes model | None |
| 4 | based on marked query | None |

Fifth step, the possible classification given by the above algorithm is verified. The cosine similarity between the term vector of the webpage and the term vector of the classification "Chinese Super League" is calculated to be 0.7, which is greater than the predetermined threshold 0.3. Therefore, it is considered to be reliable that the webpage is classified into the classification "Chinese Super League".

Figure 4:
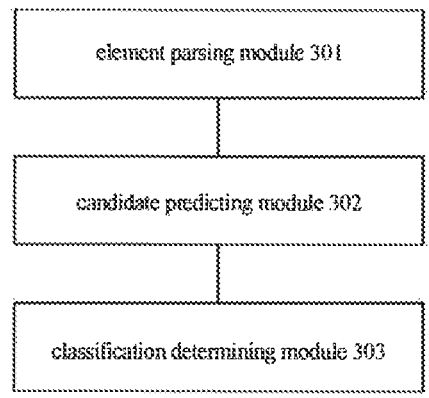
FIG. 4 shows a structural block diagram of a device for classifying webpages according to a third embodiment of the disclosure.

Referring to FIG. 4, FIG. 4 shows a structural block diagram of a device for classifying webpages according to a third embodiment of the disclosure. The device includes:

an element parsing module 301, configured for parsing multiple webpage elements from a webpage to be predicted;

a candidate predicting module 302, configured for predicting a candidate webpage classification to which the webpage to be predicted belongs respectively according to respective webpage elements; and a classification determining module 303, configured for determining a final webpage classification of the webpage to be predicted by comparing the candidate webpage classifications predicted respectively based on the respective webpage elements.

According to the embodiments of the disclosure, multiple webpage elements of the webpage to be predicted are extracted, the webpage classification of the webpage is predicted multi-dimensionally based on the multiple webpage elements, and a final webpage classification of the webpage to be predicted is determined by comparing the webpage classifications predicted based on the webpage elements. Thus, a fully automatic classification process is realized without the manual involvement, and the efficiency of webpage classification is greatly improved. Especially for massive webpages of the whole network and webpages newly generated on the Internet, the rapid and effective classification can be realized, and the timeliness of webpage classification can be ensured.

Figure 5:
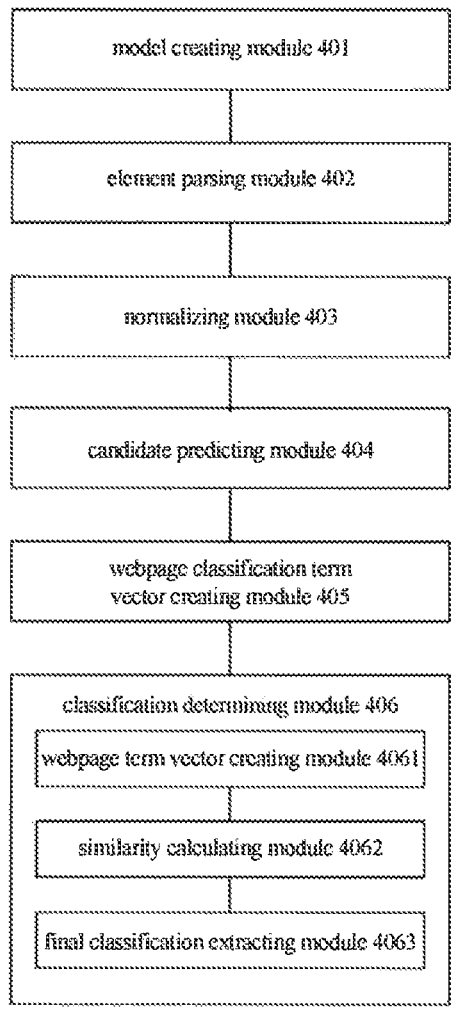
FIG. 5 shows a structural block diagram of a device for classifying webpages according to a fourth embodiment of the disclosure.

Referring to FIG. 5, FIG. 5 shows a structural block diagram of a device for classifying webpages according to a fourth embodiment of the disclosure. The device includes:

a model creating module 401, configured for creating respectively predicting models for predicting the webpage classification based on the respective webpage elements, before the parsing a plurality of webpage elements from a webpage to be predicted;

an element parsing module 402, configured for parsing multiple webpage elements from a webpage to be predicted;

a normalizing module 403, configured for normalizing the webpage elements, before the predicting a candidate webpage classification to which the webpage to be predicted belongs according to the webpage elements;

a candidate predicting module 404, configured for predicting a candidate webpage classification to which the webpage to be predicted belongs according to the webpage elements;

a webpage classification term vector creating module 405, configured for segmenting the respective queries belonging to the webpage classification, and extracting a part of segmented terms according to inverse document frequencies and term frequencies of segmented terms to create a term vector of the webpage classification, before the extracting a candidate webpage classification for which text similarity compared with the webpage to be predicted meets a precondition as the final webpage classification to which the webpage to be predicted belongs; and a classification determining module 406, configured for determining a final webpage classification of the webpage to be predicted by comparing the candidate webpage classifications predicted based on the webpage elements.

The classification determining module 406 includes:

a webpage term vector creating module 4061, configured for segmenting the webpage title and the text of the target webpage and creating a term vector of the target webpage;

a similarity calculating module 4062, configured for calculating a cosine similarity between the term vector of the candidate webpage classification and the term vector of the target webpage; and a final classification extracting module 4063, configured for extracting a candidate webpage classification for which the cosine similarity meets a preset range as the final webpage classification to which the target webpage belongs.

In an embodiment of the disclosure, preferably, the model creating module includes:

a query mining module, configured for mining a plurality of webpage classifications and queries which belong to the webpage classifications based on search logs; and a model generating module, configured for creating the predicting models for predicting the webpage classification based on the respective webpage elements according to the webpage elements and the related queries in the search logs.

In an embodiment of the disclosure, preferably, the query mining module includes:

a frequency counting module, configured for counting search frequencies of respective queries in the search logs;

a classification extracting module, configured for extracting a query of which the search frequency is greater than a preset threshold or a preset ratio as a webpage classification; and a classification adding module, configured for extracting a query which triggers the same webpage as that triggered by the webpage classification and adding the query which triggers the same webpage as that triggered by the webpage classification into the webpage classification.

In an embodiment of the disclosure, preferably, in a case that the webpage elements include a root domain name, the predicting model includes a first predicting model for predicting the webpage classification based on the root domain name, the model generating module includes:

a root domain name extracting module, configured for extracting root domain names of historical webpages accessed correspondingly in the search logs;

a query recording module, configured for recording queries corresponding to the respective root domain names according to the historical webpages and queries for triggering the historical webpages in the search logs;

a first probability calculating module, configured for calculating a first probability of the root domain name belonging to respective webpage classifications according to webpage classifications to which the queries belongs; and a first predicting model creating module, configured for creating the first predicting model comprising a judgment condition that the root domain name belongs to respective webpage classifications based on the first probability;

the candidate predicting module includes:

a first inputting module, configured for extracting a root domain name of the target webpage and inputting the root domain name of the target webpage into the first predicting model; and a first predicting module, configured for determining by the first predicting model that the first probability of which the root domain name of the target webpage belongs to a webpage classifications is greater than a first target probability, and taking the webpage classification as the candidate webpage classification to which the target webpage belongs.

In an embodiment of the disclosure, preferably, in a case that the webpage elements include a webpage title, the predicting model includes a second predicting model for predicting the webpage classification based on the webpage title, the model generating module includes:

a second predicting model creating module, configured for generating a first inverted index for retrieving the webpage classification based on a query according to the webpage classification and the query belonging to the webpage classification, and creating the second predicting model comprising the first inverted index;

the candidate predicting module includes:

a second inputting module, configured for extracting a query comprised in the webpage title of the target webpage and inputting the query comprised in the webpage title of the target webpage into the second predicting model; and a second predicting module, configured for finding by the second predicting model a webpage classification corresponding to the query according to the first inverted index, and taking the found webpage classification as the candidate webpage classification to which the target webpage belongs.

In an embodiment of the disclosure, preferably, in a case that the webpage elements include a webpage title, the predicting model includes a second predicting model for predicting the webpage classification based on the webpage title, the model generating module includes:

a third model creating module, configured for adding pre-collected queries into respective webpage classifications according to the queries belonging to the webpage classification, generating a second inverted index for retrieving the webpage classification based on the added queries, and creating the second predicting model comprising the second inverted index;

the candidate predicting module includes:

a third inputting module, configured for extracting a query comprised in the webpage title of the target webpage and inputting the query comprised in the webpage title of the target webpage into the second predicting model; and a third predicting module, configured for finding by the second predicting model a webpage classification corresponding to the extracted query according to the second inverted index, and taking the found webpage classification as the candidate webpage classification to which the target webpage belongs.

In an embodiment of the disclosure, preferably, in a case that the webpage elements include a webpage title, the predicting model includes a third predicting model for predicting the webpage classification based on the segmented term of the webpage title, the model generating module includes:

a classification recording module, configured for segmenting the queries and recording webpage classifications to which the respective segmented terms belongs; and a third model creating module, configured for calculating second probabilities of which the respective queries belong to the respective webpage classifications, and creating the third predicting model comprising a judgment condition that the respective segmented terms belongs to the respective webpage classification based on the second probabilities;

the candidate predicting module includes:

a fourth inputting module, configured for segmenting the webpage title of the target webpage and inputting segmented terms into the third predicting model; and a fourth predicting module, configured for determining by the third predicting model that the second probability of which the respective segmented terms belongs to a webpage classification is greater than a second target probability, and taking the webpage classification as the candidate webpage classification to which the target webpage belongs.

According to the embodiments of the disclosure, multiple webpage elements of the webpage to be predicted are extracted, the webpage classification of the webpage is predicted multi-dimensionally based on the multiple webpage elements, and a final webpage classification of the webpage to be predicted is determined by comparing the webpage classifications predicted based on the webpage elements. Thus, a fully automatic classification process is realized without the manual involvement, and the efficiency of webpage classification is greatly improved. Especially for massive webpages of the whole network and webpages newly generated on the Internet, the rapid and effective classification can be realized, and the timeliness of webpage classification can be ensured.

Further, the webpage classification of the disclosure can be generated by mining the historical search logs, which makes full use of the historical search data on one hand, and overcomes the problem of poor scalability of the human-defined webpage classification on the other hand.

For the above-described device for classifying webpages disclosed in the embodiments, the corresponding descriptions are relatively simple because the device is basically similar to the method disclosed in the embodiments. The relevant portions may be referred to the description for the method parts.

The embodiments of the present disclosure are described herein in a progressive manner, with an emphasis placed on explaining the difference between each embodiment and the other embodiments; hence, for the same or similar parts among the embodiments, they can be referred to from one another.

It is easily understood by those skilled in the art that any combination of the above embodiments is practicable, and thus any combination of the above embodiments is claimed in the disclosure. However, those combinations are not detailed one by one in the disclosure due to space limitations.

The solution for classifying webpages disclosed herein is not inherently related to any particular computer, virtual system, or other device. Various common systems can be used with teachings based on the above. From the above description, the structure required for constructing a system with the solution of the disclosure is obvious. In addition, the disclosure is not directed to any particular programming language. It is to be understood that the description of the disclosure herein may be embodied in various programming languages, and the particular language is described above in order to disclose the best mode of the disclosure.

The description provided here explains plenty of details. However, it can be understood that the embodiments of the disclosure can be implemented without these specific details. The known methods, structure and technology are not shown in detail in some embodiments, so as not to obscure the understanding of the description.

Similarly, it should be understood that in order to simplify the disclosure and help to understand one or more of the various aspects of the disclosure, the various features of the disclosure are sometimes grouped into a single embodiment, drawings, or description thereof in the above description of the exemplary embodiments of the disclosure. However, the method disclosed should not be explained as reflecting the following intention: that is, the disclosure sought for protection claims more features than the features clearly recorded in every claim. To be more precise, as is reflected in the following claims, the aspects of the disclosure are less than all the features of a single embodiment disclosed before. Therefore, the claims complying with a specific embodiment are explicitly incorporated into the specific embodiment thereby, wherein every claim itself as an independent embodiment of the disclosure.

Those skilled in the art can understand that adaptive changes can be made to the modules of the devices in the embodiment and the modules can be installed in one or more devices different from the embodiment. The modules or units or elements in the embodiment can be combined into one module or unit or element, and furthermore, they can be separated into more sub-modules or sub-units or sub-elements. Except such features and/or processes or that at least some in the unit are mutually exclusive, any combinations can be adopted to combine all the features disclosed by the description (including the attached claims, abstract and figures) and any method or all process of the device or unit disclosed as such. Unless there is otherwise explicit statement, every feature disclosed by the description (including the attached claims, abstract and figures) can be replaced by substitute feature providing the same, equivalent or similar purpose.

In addition, a personal skilled in the art can understand that although some embodiments described here comprise some features instead of other features included in other embodiments, the combination of features of different embodiments means falling into the scope of the disclosure and forming different embodiments. For example, in the following claims, any one of the embodiments sought for protection can be used in various combination modes.

The various components embodiments of the disclosure can be realized by hardware, or realized by software modules running on one or more processors, or realized by combination thereof. A person skilled in the art should understand that microprocessor or digital signal processor (DSP) can be used for realizing some or all functions of some or all components according to the embodiments in the disclosure in practice. The disclosure can also realize one part of or all devices or programs (for example, computer programs and computer program products) used for carrying out the method described here. Such programs for realizing the disclosure can be stored in computer readable medium, or can possess one or more forms of signal. Such signals can be downloaded from the Internet website or be provided at signal carriers, or be provided in any other forms.

Figure 6:
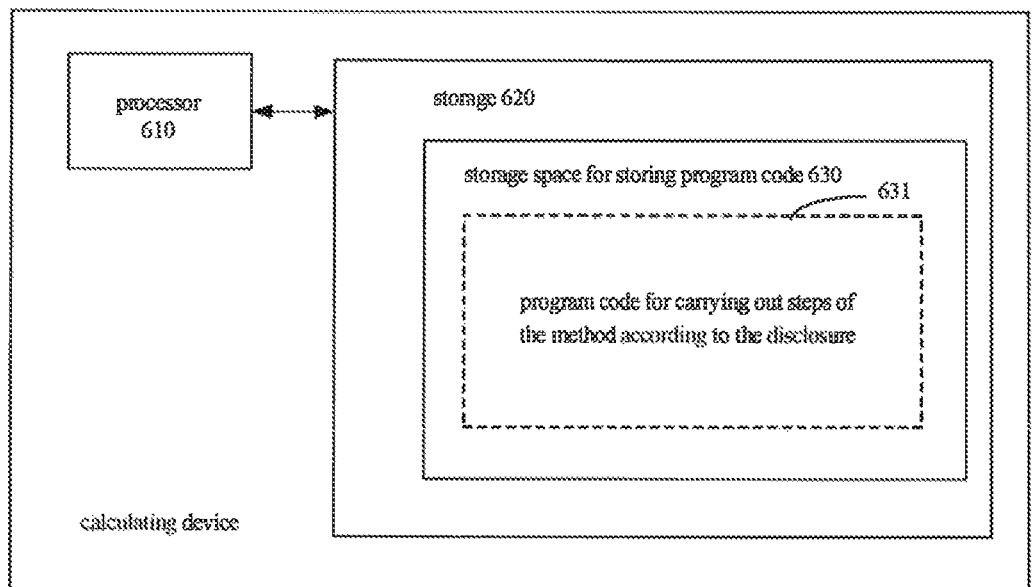
FIG. 6 schematically shows a block diagram of a calculating device for executing the method for classifying webpages according to the disclosure.
Figure 7:
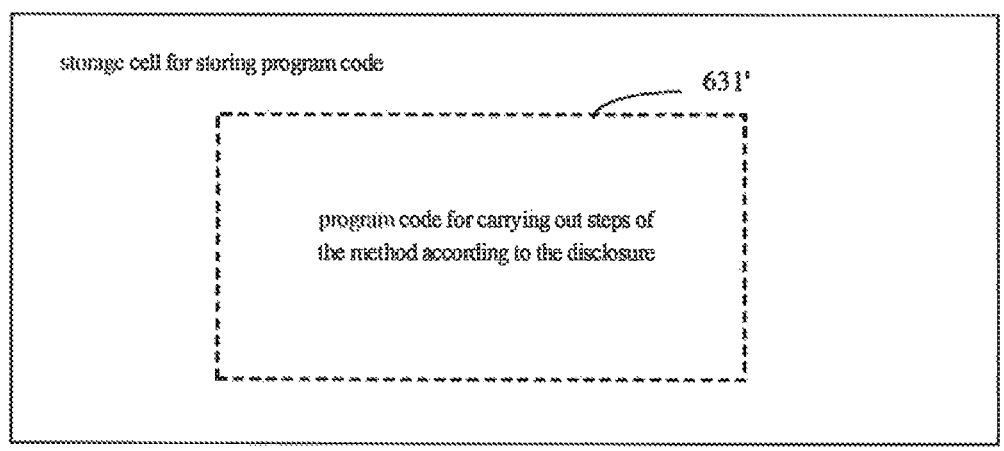
FIG. 7 schematically shows a storage cell for holding or carrying program codes for realizing the method for classifying webpages according to the disclosure.

For example, FIG. 6 shows a calculating device for achieving the method for classifying webpages according to the disclosure. The calculating device traditionally includes a processor 610 and a computer program product or a computer readable medium embodying as a storage 620. The storage 620 can be electronic storage such as flash memory, EEPROM (Electrically Erasable Programmable Read-Only Memory), EPROM, hard disk or ROM, and the like. The storage 620 possesses storage space 630 for carrying out program code 631 of any steps of aforesaid method. For example, storage space 630 for program code can comprise various program codes 631 used for realizing any steps of aforesaid method. These program codes can be read out from one or more computer program products or write in one or more computer program products. The computer program products comprise program code carriers such as memory card and the like. These computer program products usually are portable or fixed storage cell as said in FIG. 7. The storage cell can possess memory paragraph, storage space like the storage 620 in the calculating device in FIG. 6. The program code can be compressed in, for example, a proper form. Generally, storage cell comprises computer readable code 631' for performing method steps of the disclosure, i.e. the code can be read by processors such as 610 and the like. When the codes run on a computer device, the computer device will carry out various steps of the method described above.

It should be noticed that the embodiments are intended to illustrate the disclosure and not limit this disclosure, and a person skilled in the art can design substitute embodiments without departing from the scope of the appended claims. In the claims, any reference marks between brackets should not be constructed as limit for the claims. The term "comprise" does not exclude elements or steps that are not listed in the claims. The term "a" or "one" before the elements does not exclude that more such elements exist. The disclosure can be realized by means of hardware comprising several different elements and by means of properly programmed computer. In the unit claims several devices are listed, several of the devices can be embodied by a same hardware item. The use of terms first, second and third does not mean any sequence. These terms can be explained as name.

What is claimed is:

1. A device for classifying webpages, comprising:
one or more processors; and
a memory;
wherein one or more programs are stored in the memory, and when executed by the one or more processors, the one or more programs cause the one or more processors to implement the following operations:
creating respectively predicting models for predicting a webpage classification based on respective webpage elements;
parsing a plurality of webpage elements from a webpage to be predicted;
predicting a candidate webpage classification to which the webpage to be predicted belongs according to the predicting models corresponding to the respective webpage elements; and
extracting a candidate webpage classification for which text similarity compared with the webpage to be predicted meets a precondition as a final webpage classification to which the webpage to be predicted belongs,
wherein the creating respectively predicting models for predicting the webpage classification based on the respective webpage elements comprises:
mining a plurality of webpage classifications and queries which belong to the webpage classifications based on search logs; and
creating the predicting models for predicting the webpage classification based on the respective webpage elements according to the webpage elements and the related queries in the search logs;
wherein in a case that the webpage elements comprise a root domain name, the predicting models comprise a first predicting model for predicting the webpage classification based on the root domain name, and the creating the predicting models for predicting the webpage classification based on the respective webpage elements according to the webpage elements and the related queries in the search logs comprises:
extracting root domain names of historical webpages accessed correspondingly in the search logs;
recording queries corresponding to the respective root domain names according to the historical webpages and queries for triggering the historical webpages in the search logs;
calculating a first probability of the root domain name belonging to respective webpage classifications according to webpage classifications to which the queries belongs; and
create the first predicting model comprising a judgment condition that the root domain name belongs to respective webpage classifications based on the first probability;
the predicting a candidate webpage classification to which the webpage to be predicted belongs according to the predicting models corresponding to the respective webpage elements comprises:
extracting a root domain name of the target webpage and inputting the root domain name of the target webpage into the first predicting model; and
taking a webpage classification as the candidate webpage classification to which the target webpage belongs, in a case that the first predicting model determines that the first probability of which the root domain name of the target webpage belongs to the webpage classifications is greater than a first target probability.

2. A device for classifying webpages, comprising:
one or more processors; and
a memory;
wherein one or more programs are stored in the memory, and when executed by the one or more processors, the one or more programs cause the one or more processors to implement the following operations:

creating respectively predicting models for predicting a webpage classification based on respective webpage elements;

parsing a plurality of webpage elements from a webpage to be predicted;

predicting a candidate webpage classification to which the webpage to be predicted belongs according to the predicting models corresponding to the respective webpage elements; and extracting a candidate webpage classification for which text similarity compared with the webpage to be predicted meets a precondition as a final webpage classification to which the webpage to be predicted belongs, wherein the creating respectively predicting models for predicting the webpage classification based on the respective webpage elements comprises:

mining a plurality of webpage classifications and queries which belong to the webpage classifications based on search logs; and creating the predicting models for predicting the webpage classification based on the respective webpage elements according to the webpage elements and the related queries in the search logs;

wherein in a case that the webpage elements comprise a webpage title, the predicting models comprise a second predicting model for predicting the webpage classification based on the webpage title, and the creating the predicting models for predicting the webpage classification based on the respective webpage elements according to the webpage elements and the related queries in the search logs comprises:

generating a first inverted index for retrieving the webpage classification based on a query according to the webpage classification and the query belonging to the webpage classification, and creating the second predicting model comprising the first inverted index;

the predicting a candidate webpage classification to which the webpage to be predicted belongs according to the predicting models corresponding to the respective webpage element comprises:

the candidate predicting module comprises:

extracting a query comprised in the webpage title of the target webpage and inputting the query comprised in the webpage title of the target webpage into the second predicting model; and finding by the second predicting model a webpage classification corresponding to the query according to the first inverted index, and taking the found webpage classification as the candidate webpage classification to which the target webpage belongs.

3. A device for classifying webpages, comprising:
one or more processors; and
a memory;

wherein one or more programs are stored in the memory, and when executed by the one or more processors, the one or more programs cause the one or more processors to implement the following operations:

creating respectively predicting models for predicting a webpage classification based on respective webpage elements;

parsing a plurality of webpage elements from a webpage to be predicted;

predicting a candidate webpage classification to which the webpage to be predicted belongs according to the predicting models corresponding to the respective webpage elements; and extracting a candidate webpage classification for which text similarity compared with the webpage to be predicted meets a precondition as a final webpage classification to which the webpage to be predicted belongs, wherein the creating respectively predicting models for predicting the webpage classification based on the respective webpage elements comprises:

mining a plurality of webpage classifications and queries which belong to the webpage classifications based on search logs; and creating the predicting models for predicting the webpage classification based on the respective webpage elements according to the webpage elements and the related queries in the search logs;

wherein in a case that the webpage elements comprise a webpage title, the predicting models comprise a second predicting model for predicting the webpage classification based on the webpage title, and the creating the predicting models for predicting the webpage classification based on the respective webpage elements according to the webpage elements and the related queries in the search logs comprises:

adding pre-collected queries into respective webpage classifications according to the queries belonging to the webpage classification, generating a second inverted index for retrieving the webpage classification based on the added queries, and creating the second predicting model comprising the second inverted index;

the predicting a candidate webpage classification to which the webpage to be predicted belongs according to the predicting models corresponding to the respective webpage elements comprises:

extracting a query comprised in the webpage title of the target webpage and inputting the query comprised in the webpage title of the target webpage into the second predicting model; and finding by the second predicting model a webpage classification corresponding to the extracted query according to the second inverted index, and taking the found webpage classification as the candidate webpage classification to which the target webpage belongs.

* * * * *